D. H. TWAITS.
GREASE CUP BODY.
APPLICATION FILED JAN. 19, 1914.
1,225,375.
Patented May 8, 1917.
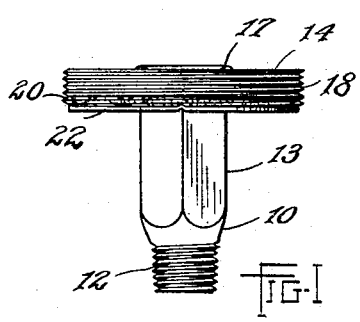
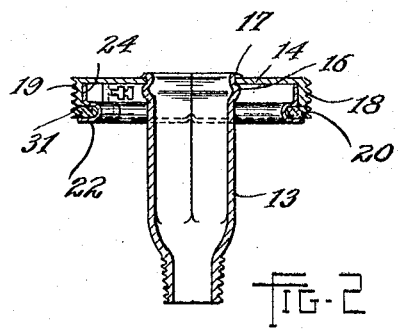
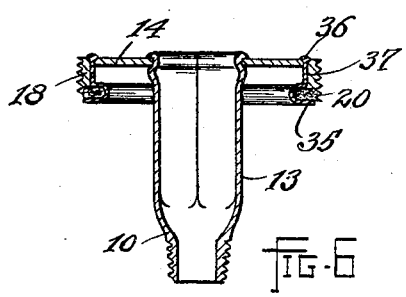
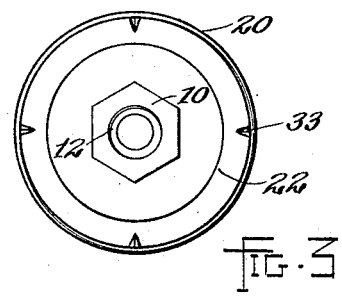
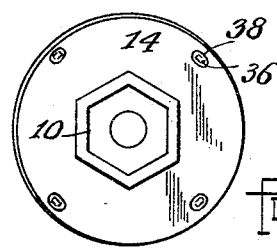
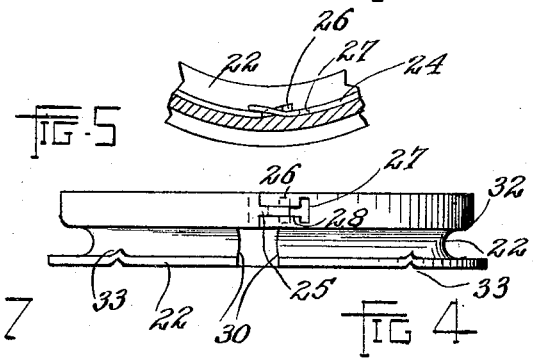
Witnesses
Inventor
Daniel H. Twaits
By Albert H. Bates.
Atty

UNITED STATES PATENT OFFICE.

DANIEL H. TWAITS, OF CHICAGO, ILLINOIS.

GREASE-CUP BODY.

1,225,375.  Specification of Letters Patent.  Patented May 8, 1917.

Application filed January 19, 1914. Serial No. 812,873.

*To all whom it may concern:*

Be it known that I, DANIEL H. TWAITS, a citizen of the United States, residing at Chicago, in the county of Cook and State of Illinois, have invented a certain new and useful Improvement in Grease-Cup Bodies, of which the following is a full, clear, and exact description, reference being had to the accompanying drawings.

This invention relates to grease cup bodies of a type wherein there is a tubular stem and a disk-like head having external threads at its periphery, and a resilient member adapted to conform to the threads of a cap member fitting over the head, to prevent leakage of grease past the head. The object of the invention is to provide such a body which shall be durable, of simple construction and cheaply manufactured. A more specific object is to provide a simple and efficient means for holding the resilient member in position.

My invention is hereinafter more fully described in connection with the drawings and the essential characteristics set forth in the claims.

Figure 1 is a side elevation of my grease cup body; Fig. 2 is a vertical central section of the same; Fig. 3 is a bottom plan of the same; Figs. 4 and 5 are enlarged details of the device for holding the resilient member in place; Fig. 6 is a vertical central section showing the modified construction and Fig. 7 is a top plan of the same.

In the drawings, 10 indicates the stem of the grease cup which has a reduced portion externally threaded as at 12, and an angular portion 13 which extends upwardly through a disk-like member 14 securely held in place by an outwardly projecting head 16 engaging the under side of the disk, and an upset portion 17 of the upper end of the stem which is spread outwardly to engage the upper side of the disk. At the outer periphery of this disk is a downwardly turned flange or skirt 18 externally threaded as at 19, to coöperate with the internal threads of a suitable cap member.

At the lower edge of this flange 18 is a resilient ring 20 of such diameter that its outer periphery is adapted to conform to the internal threads of the cap member and prevent grease leaking past the head of the body. As a means for securely holding this ring in position, I provide a ring 22 having a substantially U-shaped cross section at its lower portion, forming an annular groove in which the resilient ring is seated. Extending upwardly from the upper side of this grooved portion is a flange 24 adapted to engage the inner periphery of the flange or skirt 18, of the disk 14. This ring member 22 and its flange 24 are split at one side and projecting from one edge is a tongue 25 having a T-shaped head 26. This head is adapted to be passed through a corresponding portion 27 of a T-slot 28. The ring member is preferably made of spring steel and is adapted to spring outwardly to tightly engage the inner surface of the flange 18. Before the ring is put in place, the head 26 is passed through the corresponding opening of the T-slot 28, and the resilient member is placed in the grooved portion of the ring which is then contracted slightly, and placed into the flange 18, and allowed to expand, the head 26 then drawing away from the corresponding portion 27 of the slot 28, as indicated in Figs. 2 and 4. In order to allow this head to be sprung through the opening 27, the U-shaped portion is cut away at each side of the split in the ring, as shown at 30. At the lower edge of the flange or skirt 18, is provided an inwardly turned portion 31 forming in effect a flange, which engages the rounded portion 32 of the ring member 22 and prevents the same becoming displaced by the ring 24 moving out of the flange 18.

In this manner the resilient member is securely held in position, and it is prevented from rotating with relation to the head by means of projections 33 pressed upwardly from the lower portion of the ring member 22.

In the modified construction shown in Fig. 6, the ring portion 35 having U-shaped groove and corresponding to the ring portion 22 in the form first described, is indicated at 35, and is held in position by lugs 36 extending upwardly from the flange 37 which corresponds to the flange 24, and tightly fits the inner surface of the flange 18. These lugs extend through openings in the disk 14 and are upset at their upper ends as at 38, to hold the ring member in place.

Having thus described my invention, what I claim is:

1. A grease cup body comprising a stem, a disk rigid therewith and having a cylindrical flange at its outer edge, a resilient member, and a ring embracing said resilient member and having a portion tightly fitting the inner periphery of the first mentioned flange.

2. In a grease cup body, the combination of a tubular stem, a disk rigid with the upper end thereof and having a cylindrical flange, a resilient ring at the edge of said flange, a ring having a groove in which said resilient ring is mounted and having a cylindrical flange tightly fitting the interior of the first mentioned flange.

3. In a grease cup body, the combination of a tubular stem, a disk rigid with the upper end thereof and having a cylindrical flange at its outer edge, a ring having a portion substantially U-shaped in cross section forming an annular groove facing outwardly and a resilient ring mounted in said groove, and a flange integral with said ring and adapted to engage the inner surface of the first mentioned flange, and means for holding the same in position.

4. In a grease cup body, the combination of a tubular stem, a disk rigid with the upper end thereof and having a cylindrical flange at its outer edge, a resilient member at one edge of said flange, and a ring having a grooved portion carrying said resilient member and having a cylindrical flange extending from one side thereof, said ring being split at one point and adapted to spring outwardly whereby it is held in position by its flange engaging the inner surface of the flange on the disk.

5. In a grease cup body, the combination of a tubular stem having a disk rigid with the upper end thereof and having a downwardly turned flange externally threaded, a resilient ring having its outer periphery adjacent the threaded portion of said flange, and a ring having a U-shaped cross section forming the groove in which said resilient ring is mounted, and an upwardly extending cylindrical flange adapted to engage the interior of the flange on the disk, said U-shaped ring and flange being split and having a T-slot and a T-member adapted to have its head portion passed through the corresponding portion of the T-slot and adapted to engage the shank of said slot when the ring is in position, and being held in position by the ring member tending to spring outwardly.

6. In a grease cup body, the combination of a tubular stem, a disk rigid with the upper end thereof and having a cylindrical flange at its outer edge, a resilient member at the edge of said flange, a grooved ring carrying said resilient member and having a flange engaging the inner surface of the flange on the disk, said flange on the disk having an inwardly projecting portion engaging one edge of the groove whereby the grooved ring is held in position.

7. In a grease cup body, the combination of a tubular stem, a disk rigid with the upper end thereof and having a cylindrical flange at its outer edge, a resilient member at the edge of said cylindrical flange, and a grooved ring carrying said resilient member and having a cylindrical flange embracing the inner surface of the flange on the disk and means for holding the grooved ring in position.

8. A grease cup body comprising a stem, an outwardly extending head rigid therewith and having a flange projecting longitudinally with relation to the stem, a resilient ring member of substantially the same diameter as the flange, a grooved member carrying said ring, and means for securing the grooved member to the stem.

9. A grease cup body comprising a stem, an outwardly extending head rigid therewith and having a flange threaded on its outer periphery, a fibrous ring of substantially the same diameter as the thread and resting against one edge of the flange, and a grooved member adapted to receive said ring for holding the same in position.

10. A grease cup body comprising a stem, a disk rigid therewith and having a flange at its outer edge, a resilient ring adjacent the threads, and a member having a groove receiving the ring and engaging said flange.

11. The combination of a grease cup body comprising a stem and a head rigid therewith and having a vertical flange at its outer edge, a resilient ring adjacent to the flange, and means secured to the head and providing shoulders engaging each side of the resilient ring and the inner periphery thereof.

In testimony whereof, I hereunto affix my signature in the presence of two witnesses.

DANIEL H. TWAITS.

Witnesses:
 KARL KUHNEN,
 C. H. CRONK.